No. 772,567. PATENTED OCT. 18, 1904.
P. C. M. J. HÉDON.
MACHINE FOR WASHING PLATES, DISHES, OR THE LIKE.
APPLICATION FILED FEB. 12, 1904.
NO MODEL. 2 SHEETS—SHEET 1.

WITNESSES:
P. W. Wright
E. W. Collins

INVENTOR
Paul Charles Marie Joseph Hédon
BY
Howson and Howson
HIS ATTORNEYS

No. 772,567. PATENTED OCT. 18, 1904.
P. C. M. J. HÉDON.
MACHINE FOR WASHING PLATES, DISHES, OR THE LIKE.
APPLICATION FILED FEB. 12, 1904.
NO MODEL. 2 SHEETS—SHEET 2.

WITNESSES:
F. W. Wright
E. W. Collins

INVENTOR
Paul Charles Marie Joseph Hédon
BY Howson and Howson
HIS ATTORNEYS.

No. 772,567. Patented October 18, 1904.

UNITED STATES PATENT OFFICE.

PAUL CHARLES MARIE JOSEPH HÉDON, OF ROUBAIX, FRANCE.

MACHINE FOR WASHING PLATES, DISHES, OR THE LIKE.

SPECIFICATION forming part of Letters Patent No. 772,567, dated October 18, 1904.

Application filed February 12, 1904. Serial No. 193,351. (No model.)

*To all whom it may concern:*

Be it known that I, PAUL CHARLES MARIE JOSEPH HÉDON, commercial traveler, a citizen of the Republic of France, residing at 25 Rue Parmentier, Roubaix, France, have invented a certain new and useful Machine for Washing Plates, Dishes, or the Like, of which the following is a full, clear, and exact description, and for which I have applied for Letters Patent in France, dated February 12, 1903, No. 329,362; in Great Britain, dated August 21, 1903, No. 18,106; in Germany, dated February 17, 1903, and in Belgium, dated August 8, 1903, No. 171,966.

This invention has reference to machines for washing and cleansing plates, dishes, and the like, and according to this invention such washing is effected by means of rotary brushes, while the mass of water contained in the receptacle is set in motion in a continuous manner, which facilitates the detachment of the bodies adhering to the plates or dishes placed in the apparatus.

In order that my said invention may be readily understood and carried into effect, I have shown in the accompanying drawings two forms of machine embodying this invention.

Figure 1:
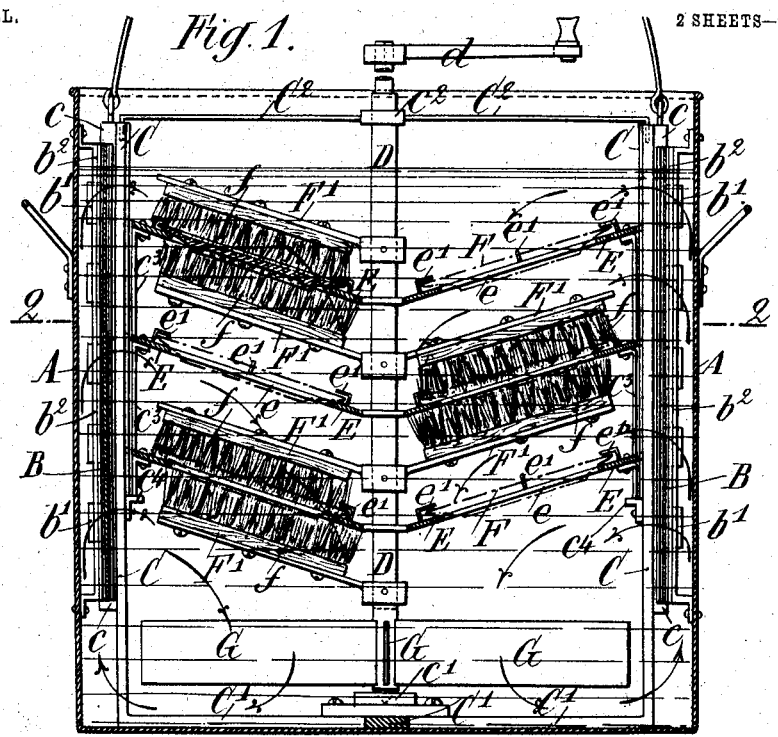
Figure 2:
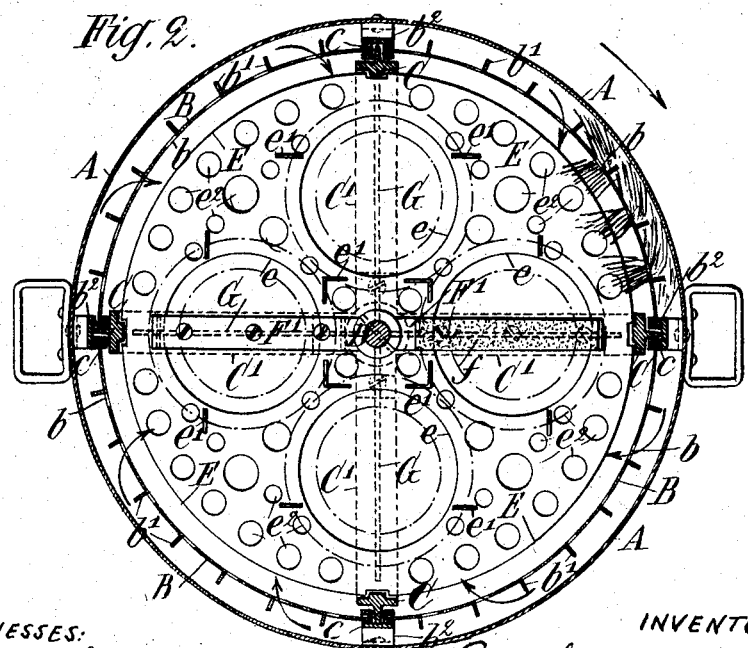
Figure 3:
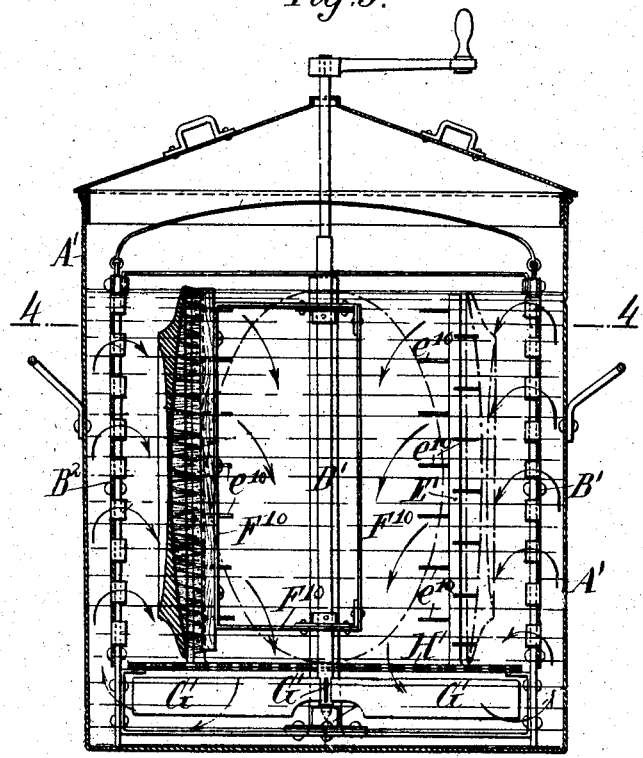
Figure 4:
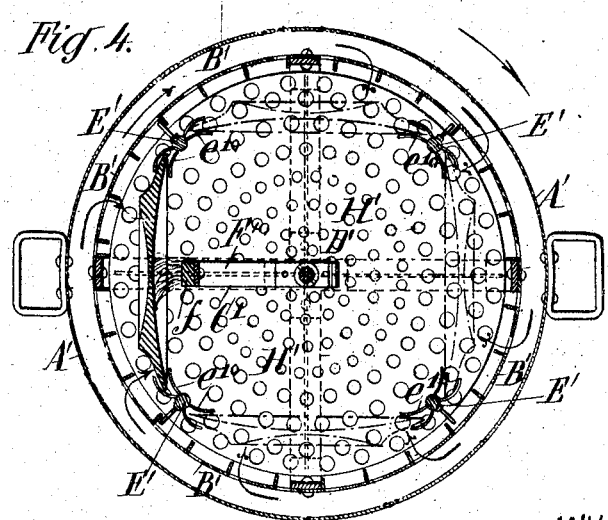

Figure 1 is a vertical section through a machine adapted for washing a large number of plates or the like at one operation and which is more especially suited for restaurants, hotels, schools, and the like. Fig. 2 is a horizontal section on the line 2 2 of Fig. 1. Fig. 3 is a vertical section through a machine for washing a small number of plates or the like at one operation and more particularly suited for domestic use. Fig. 4 is a horizontal section on the line 4 4 of Fig. 3.

The machine represented in Figs. 1 and 2 has as a main element a cylindrical receptacle A, which may be placed upon a fire in order to maintain the washing-water at a suitable temperature. In this receptacle is arranged a cylinder B, in the entire surface of which are formed orifices $b\ b$, which are preferably obtained by cutting away the sheet metal of which this cylinder is constituted and forcing back the tongues of metal $b'$ in order to form the holes. These tongues $b'$ serve, as is hereinafter explained, to direct the thin streams of liquid toward the center of the apparatus. The cylinder B is rigid with the vessel A, to which it is attached by uprights $b^2$, a small space only separating it from the receptacle A. In said receptacle A is arranged a casing constituted by vertical uprights C C and diametrical arms $C'\ C^2$, situated at the base and at the upper part. In the axis of this casing or framework (and of the receptacle A consequently) is mounted a vertical shaft D, provided with a handle $d$ at its upper portion, while its lower end rests in a bearing $c'$, rigid with the horizontal cross-pieces $C'$ and journaled at its upper part in a socket $c^2$, rigid with the arms $C^2$. The vertical uprights C comprise ribs $c$, which engage in grooves formed by the uprights $b^2$, which connect the cylinder B with the receptacle A. This disposition serves to prevent the assemblage constituted by the casing and the parts which it supports from rotating when the shaft D is turned. This shaft D is provided at its upper part with a crank $d$, by means of which it is rotated.

In the cage formed by the uprights C disks E, preferably conical in form, may be superposed. These disks contain orifices $e$ of suitable dimensions for the reception of the plates or dishes to be washed. The periphery of these latter rests on these disks and is also engaged beneath small hooks $e'$. In the machine represented in the drawings the plates are marked F. These disks are also perforated with small holes $e^2$ in the intervals between the large orifices for the reception of the plates. The disks E rest upon supports $c^3$, rigid with the disks E, and bear upon projections $c^4$ of the uprights C.

To the shaft D are fixed radiating arms F', to which are secured brushes $f\ f$, which during their rotation with the shaft D brush the plates upon both sides. The shaft D carries at its lower portion wings G, preferably helicoidal, which during the rotation of the shaft D serve to project the mass of water against the lateral wall of the vessel A.

The operation of this machine is as follows:

In the vessel A is placed a suitable quantity of water, which may be maintained at the desired temperature by placing the whole apparatus upon a fire in the manner of an ordinary saucepan. The plates to be washed are placed upon the disks F in the openings e provided for them. The handle d is then turned, thus producing the rotation of the shaft D, with its brushes and wings. The brushes rub upon both sides of the plates. The wings direct the mass of water against the cylindrical wall of the vessel A, toward the top of which it rises with a gyratory movement. Owing to the suction produced toward the center of the liquid mass, the water in proximity to the wall of the vessel moves toward the center approximately in the manner indicated by the arrows marked on the drawings. As a result of this circulation of the water and the action of the brushes a perfect washing and cleansing of the plates or dishes is effected very rapidly. When the washing has been completed, the casing, together with the shaft D and its parts, are lifted, the clean plates removed and replaced by fresh plates to be washed. The disks E may be horizontal; but it is preferred to make them conical, as this reduces the resistance to the lifting of the casing at each fresh operation.

The operation is effected with the greatest rapidity, and a large number of plates or dishes may be thoroughly washed in a minimum of time.

Figs. 3 and 4 represent a machine intended for washing a small number of plates only at each operation and is especially designed for domestic use. This machine comprises all the constituent parts of the machine described above. It only differs therefrom owing to the fact that the plates are arranged vertically, and the brushes, which only pass over one of their faces, are mounted in a corresponding position.

The device of Figs. 3 and 4 consists of the casing A', within which is placed the plate-supporting frame B', a perforated plate H' being placed a distance above the lower end of the frame B'. The shaft D' carries a frame $F^{10}$, carrying a vertical brush, while vertical rods $E^2$, with spring-clips $E^{10}$, serve to hold the dishes in vertical position. The shaft D' carries the fan G' below the perforated plate H'. In all other respects of construction and in operation the device is similar to that shown in Figs. 1 and 2.

The machines described above may of course be modified in any way whereby the essential features explained are not departed from.

I claim as my invention—

1. A dish-washing machine, comprising a vessel for the washing-water, a perforated cylinder within the vessel, a rotating central shaft, brushes thereon, and means at the lower end of the shaft for projecting the water outwardly and upward between the vessel and cylinder and means for supporting the dishes within the cylinder.

2. A dish-washing machine, comprising a vessel for the washing-water, a perforated cylinder within the vessel, said cylinder having portions of its surface formed into tongues for directing the water through its perforations, a rotating central shaft, brushes thereon, and means at the lower end of the shaft for projecting the water outwardly and upward between the vessel and cylinder, and means for supporting the dishes within the cylinder.

3. A dish-washing machine, comprising a vessel for the washing-water, a perforated cylinder within the vessel, a rotating central shaft, brushes thereon and means at the lower end of the shaft for projecting the water outwardly and upward between the vessel and cylinder, and parallel disk-like supports for the dishes surrounding the central shaft and secured within said cylinder.

4. A dish-washing machine, comprising a vessel for the washing-water, a perforated cylinder within the vessel, a rotating central shaft, brushes thereon and means at the lower end of the shaft for projecting the water outwardly and upward between the vessel and cylinder, and parallel conical disk-like supports for the dishes surrounding the central shaft and secured within said cylinder.

5. A dish-washing machine, comprising a vessel for the washing-water, a perforated cylinder within the vessel, a rotating central shaft, brushes thereon and means at the lower end of the shaft for projecting the water outwardly and upward between the vessel and cylinder, and a perforated plate above said water-projecting means, and means for supporting the dishes within the cylinder.

In testimony whereof I have signed my name to this specification in the presence of two subscribing witnesses.

PAUL CHARLES MARIE JOSEPH HÉDON.

Witnesses:
PIERRE ROUZÉ,
E. DELLNA.